(12) United States Patent
Sharpe et al.

(10) Patent No.: US 7,654,496 B2
(45) Date of Patent: Feb. 2, 2010

(54) QUICK RELEASE BRACKET

(75) Inventors: Robert Sharpe, Corona, CA (US); Gary Chez, Riverside, CA (US)

(73) Assignee: Summit Industries, Inc., Corona, CA (US)

( * ) Notice: Subject to any disclaimer, the term of this patent is extended or adjusted under 35 U.S.C. 154(b) by 327 days.

(21) Appl. No.: 11/276,019

(22) Filed: Feb. 9, 2006

(65) Prior Publication Data
US 2007/0181757 A1  Aug. 9, 2007

(51) Int. Cl.
A47B 96/00 (2006.01)
(52) U.S. Cl. ............. 248/222.11; 248/393; 248/397; 248/222.13; 403/321; 403/322.4; 403/326; 180/219; 280/288.4; 280/304.5; 224/413; 297/230.1; 297/357; 297/376; 292/106; 292/207; 292/208
(58) Field of Classification Search ............ 248/222.11, 248/393, 397, 221.11, 222.13; 403/325, 403/328, 315, 321, 322.4; 180/219; 280/288.4, 280/304.5; 224/413, 415, 418; 297/230.1, 297/357, 376; 292/106, 207, 208
See application file for complete search history.

(56) References Cited

U.S. PATENT DOCUMENTS

| | | | |
|---|---|---|---|
| 1,950,574 A | 3/1934 | Smith | |
| 4,040,665 A | 8/1977 | Wallace et al. | |
| 4,051,985 A | 10/1977 | Berger | |
| 4,226,302 A | 10/1980 | Roche | |
| 4,759,580 A | 7/1988 | Berklich, Jr. et al. | |
| 4,773,693 A | 9/1988 | Premji et al. | |
| 4,810,162 A | 3/1989 | Foster | |
| 4,993,731 A * | 2/1991 | Fuller | 280/202 |
| 5,368,409 A | 11/1994 | Marzullo et al. | |
| 5,429,207 A | 7/1995 | Frank et al. | |
| 5,664,715 A | 9/1997 | Gogan et al. | |
| 5,667,232 A * | 9/1997 | Gogan et al. | 280/202 |
| 5,725,138 A | 3/1998 | Zagrodnik | |
| 5,732,965 A | 3/1998 | Willey | |
| 6,347,804 B1 * | 2/2002 | Seibel | 280/288.4 |
| 8,347,804 | 2/2002 | Seibel | |
| 6,443,344 B1 | 9/2002 | Nicosia et al. | |

(Continued)

FOREIGN PATENT DOCUMENTS

GB   850048   9/1960

(Continued)

*Primary Examiner*—A. Joseph Wujciak, III
*Assistant Examiner*—Todd M. Epps
(74) *Attorney, Agent, or Firm*—William A. English; Vista IP Law Group LLP

(57) ABSTRACT

A backrest for a motorcycle includes a base plate including an upper portion, and a lower portion including first and second opposing ends. A frame and/or pad are attached to the support portion. The lower portion includes a first vertical recess in the first end, and a second horizontal recess in the second end. A bracket is slidably mounted to the base portion, the bracket being slidable along a transverse axis between open and closed positions. In the closed position, a third recess in the bracket at least partially encloses the second recess for securing a pin within the second and third recesses. A locking arm is pivotally mounted to the bracket member for releasably securing the bracket member in the closed position. The bracket member and locking arm allow the backrest to be quickly attached to and released from a motorcycle.

18 Claims, 3 Drawing Sheets

U.S. PATENT DOCUMENTS

| | | |
|---|---|---|
| 6,840,344 B2 | 1/2005 | Galbraith et al. |
| 6,840,704 B1 * | 1/2005 | Monson ............... 403/325 |
| 7,175,220 B2 * | 2/2007 | Kashiwagi et al. ....... 296/65.03 |
| 2005/0046250 A1 | 3/2005 | Renner |

FOREIGN PATENT DOCUMENTS

| | | |
|---|---|---|
| GB | 1388939 | 3/1975 |
| JP | 58012842 | 1/1983 |
| JP | 59149833 | 8/1984 |
| JP | 6107050 | 4/1994 |

* cited by examiner

QUICK RELEASE BRACKET

FIELD OF THE INVENTION

The present invention relates generally to apparatus and methods for securing a vehicle accessory to a vehicle, and, more particularly, to a bracket apparatus for securing an accessory, such as a backrest or rack, to a vehicle, such as a motorcycle, and to methods for making and using such apparatus.

BACKGROUND

Devices and methods are known for attaching vehicle accessories, such as backrests, racks, and the like, to vehicles. This is particularly true when the vehicle is a motorcycle, as the compact design of the motorcycle limits the amount of equipment that may be placed on it. Motorcycles are thus associated with an array of accessories that are selectively attachable and detachable from the motorcycle. For example, U.S. Pat. No. 5,667,232 discloses a detachable sissy bar for a motorcycle, while U.S. Pat. No. 6,840,704 discloses a quick release system for motorcycle backrests.

It is therefore desirable to have apparatus and methods for attaching and/or detaching accessories to and/or from motorcycles.

SUMMARY OF THE INVENTION

The present invention is directed to apparatus and methods for securing a vehicle accessory to a support structure on a vehicle, and, more particularly, to a bracket apparatus that may quickly and/or easily secure an accessory, such as a backrest or rack, to a support structure on a motorcycle or other vehicle.

In accordance with one embodiment, a device is provided for securing an accessory to a support structure on a vehicle. The device includes a base member including an upper portion, and a lower portion, the lower portion including a first recess extending along a first axis for receiving a pin of the support structure therein when the first bracket is aligned with the support structure. A bracket member is slidably mounted to the base portion, the bracket member being slidable along a transverse axis between an open position and a closed position, wherein, in the closed position, a portion of the bracket member at least partially encloses the first recess. For example, the bracket member may include a third recess that is at least partially coextensive with the first recess in the closed position.

Optionally, the device may include a lock on at least one of the base portion and the bracket member for releasably securing the bracket member in the closed position. In an exemplary embodiment, the lock may include a locking arm pivotally mounted to the bracket member. The base member may include a stop that the locking arm engages in the closed position to prevent subsequent movement of the bracket member towards the open position. Optionally, the locking arm may be biased into engaging the stop, the locking arm being pivotable for disengaging the locking arm from the stop, thereby allowing the bracket member to be directed towards the open position.

In an exemplary embodiment, the lower portion of the base portion may include first and second ends. The first end may include the first recess, and the second end may include a second recess extending along a second axis orthogonal to the first axis for receiving another pin of the support structure therein. In one embodiment, the first axis may extend substantially vertically and the second axis may extend substantially horizontally. The transverse axis may extend diagonally relative to the first axis and/or the second axis.

In another option, the device may include a support structure attached to or otherwise extending from the upper portion of the base member. For example, the support structure may include a frame, a backrest, and/or a rack.

In accordance with another embodiment, a backrest for a motorcycle is provided that includes a base member including an upper portion, and a lower portion including first and second opposing ends. The first end may include a first substantially vertical recess therein, and the second end may include a second substantially horizontal recess therein. A bracket member is slidably mounted to the base portion, the bracket member being slidable along a transverse axis between an open position and a closed position. In the closed position, a third recess in the bracket member at least partially encloses the second recess for securing a pin within the second and third recesses. Optionally, a lock may be provided on the bracket member for releasably securing the bracket member in the closed position.

A backrest member extends from the upper portion of the base member. For example, a post or other frame may be attached to the upper portion of the base member, and a pad or other backrest may be attached to the frame. Optionally, the backrest may include a pair of base members, each with a bracket member and/or lock, e.g., on lower ends of posts of other portions of the frame carrying the backrest.

In accordance with still another embodiment, a method is provided for mounting an accessory to a support structure on a motorcycle. Generally, the accessory includes a base member including first and second recesses therein, the first and second recesses extending orthogonally relative to one another, and a bracket slidably mounted to the base member. A first pin of the support structure may be inserted into the first recess, and a second pin of the support structure may be inserted into the second recess, e.g., by pivoting the accessory. The bracket may be slid from an open position to a closed position to secure the second pin within the second recess. For example, the bracket may be slid until a third recess in the base portion is at least partially coextensive with the second recess, thereby securing the second pin within the second and third recesses.

Optionally, the bracket may include a locking mechanism that releasably locks the bracket in the closed position, e.g., with the second pin secured within the second and third recesses. In one embodiment, the locking mechanism may be biased to automatically lock the bracket in the closed position. The locking mechanism may be manipulated to disengage the locking mechanism, thereby allowing the bracket to be moved back towards the open position. Thus, the bracket may allow for quick attachment and/or detachment of the accessory to and/or from the support structure of the motorcycle.

Other aspects and features of the present invention will become apparent from consideration of the following description taken in conjunction with the accompanying drawings.

DETAILED DESCRIPTION OF THE EMBODIMENTS

Figure 1:
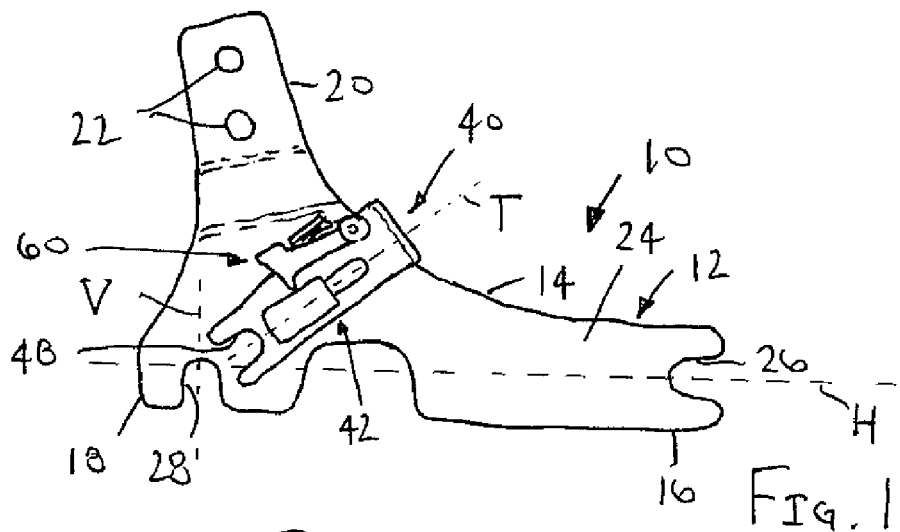
FIGS. 1 and 2 are side views of an exemplary embodiment of a bracket apparatus including a bracket in open and closed positions, respectively.
Figure 2:
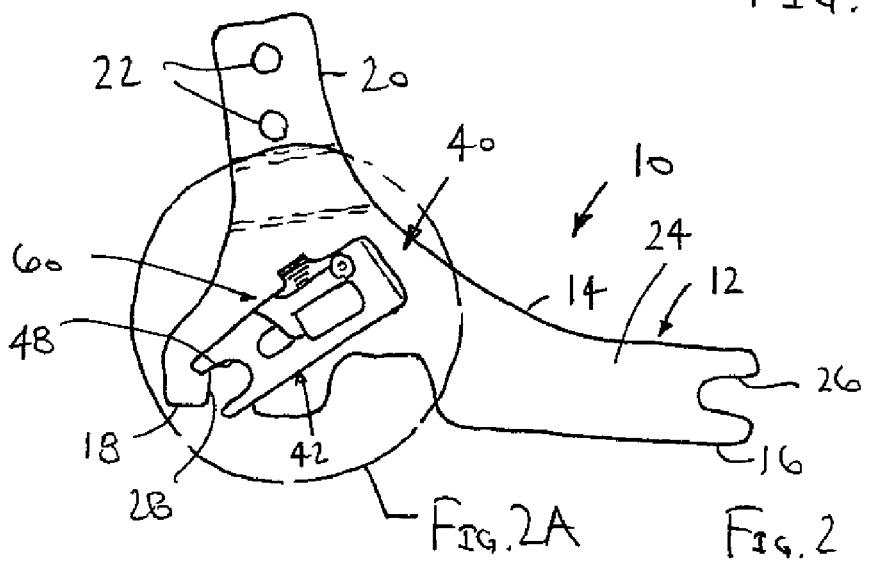
Figure 2A:
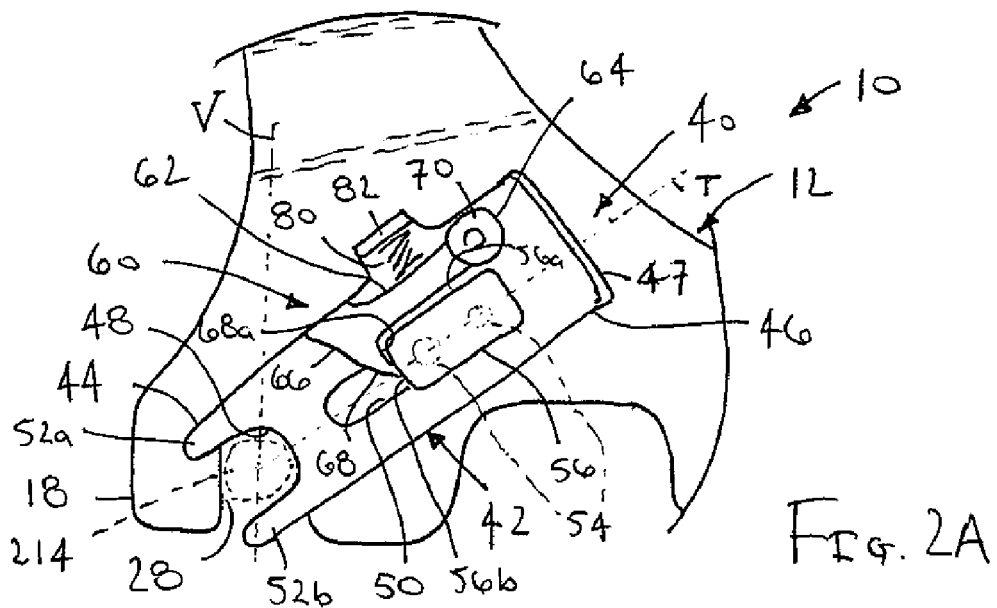
FIG. 2A is a detail of the bracket apparatus shown in the closed position of FIG. 2.
Figure 3:
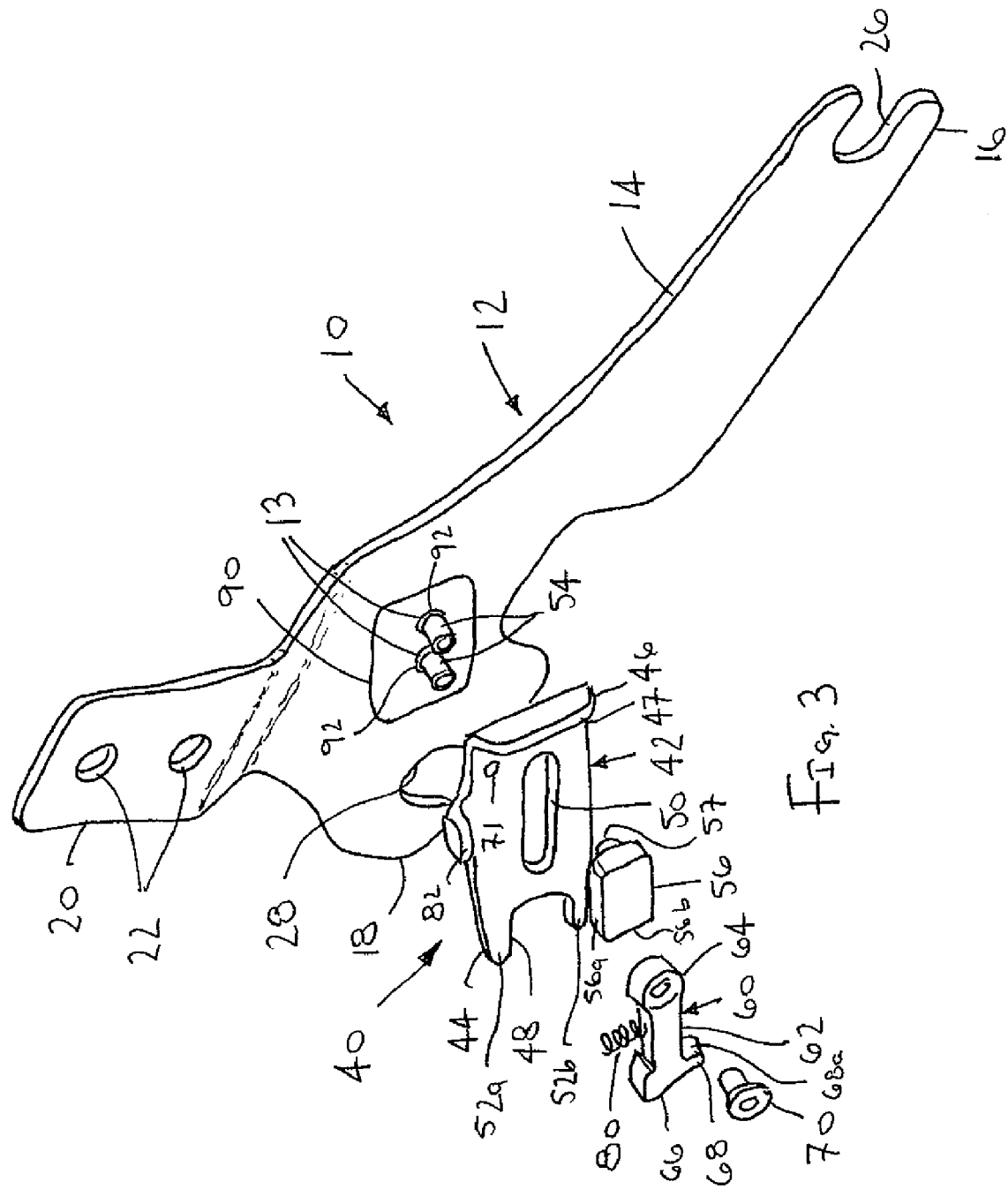
FIG. 3 is an exploded perspective view of the bracket apparatus of FIGS. 1 and 2.

Turning to the drawings, FIGS. 1-3 show an exemplary embodiment of a bracket apparatus 10 that may be combined with a vehicle accessory (not shown) for securing the accessory to a support structure of a vehicle (also not shown). For example, as described further below, the accessory may be a backrest, a rack, or other item suited for securing on a vehicle, such as, a motorcycle. Also as described further below, the bracket apparatus 10 may facilitate releasably securing an accessory to an existing support structure on a vehicle, such as a mount or frame, e.g., including one or more pins, rods, and the like.

Generally, the bracket apparatus 10 includes a base member, e.g., a base plate 12, and at least one latch member 40 for securing the side plate 12 to a vehicle, e.g., a motorcycle (not shown). As shown, the base plate 12 includes a lower portion 14 including first and second opposing ends 16, 18, and an upper portion 20 including a connector 22 for securing a post or other structure (not shown) to the bracket apparatus 10. The base plate 12 also generally includes a front face 24, and an opposing back face (not shown), the latch member 40 being movably mounted to at least one of the faces, as described further below.

In addition, the base plate 12 includes one or more slots, pockets, or other recesses, e.g., a first recess 26 extending into the first end 16 and a second recess 28 extending into the second end 18. The recesses 26, 28 may be spaced from one another and/or otherwise located to correspond to respective mounts on a support structure of the vehicle (not shown), e.g., as described further below.

Generally the recesses 26, 28 are aligned orthogonally, e.g., substantially perpendicular, relative to one another. Stated differently, the first and second recesses 26, 28 may define axes extending substantially parallel to the depth of the respective recesses 26, 28, and the respective axes may intersect one another. For example, as shown in FIGS. 1-3, the first recess 26 may extend substantially horizontally, e.g., from a front edge of the first end 16, while the second recess 28 may extend substantially vertically, e.g., from a lower edge of the second end 18. Thus, as shown, the first recess 26 may define a substantially horizontal axis "H" and the second recess 28 may define a substantially vertical axis "V," which intersect one another.

With particular reference to FIG. 3, the latch member 40 includes an elongate bracket member 42 movable relative to the base plate 12, and a locking mechanism 60. Generally, the bracket member 42 is movable towards the second recess 28 to at least partially enclose the second recess 28, i.e., to a closed position, such as that shown in FIG. 2, and/or away from the second recess 28, i.e., to an open position, such as that shown in FIG. 1. The locking mechanism 60 may selectively secure the bracket member 42 in the closed and/or open position, as described further below.

In the embodiment shown an FIGS. 1 and 2, the bracket member 42 is slidable along the front face 24 of the base plate 12, thereby defining a transverse axis "T" that intersects the vertical axis "V" defined by the second recess 28. As shown, the transverse axis "T" extends diagonally relative to the vertical axis "V," thereby defining an acute angle therebetween, i.e., between about zero and ninety degrees (0-90°), or, more particularly, between about thirty and sixty degrees (30-60°).

Generally, the bracket member 42 includes first and second ends 44, 46, a third recess 48 extending into the first end 44, and a slot 50 extending partially between the first and second ends 44, 46. Optionally, the second end 46 may include an outward flange 47 or other grip structure, e.g., that may facilitate manipulation of the bracket member 42.

As described further below, the slot 50 may limit movement of the bracket member 42 relative to the base plate 12, i.e., between the locations of the open and closed positions. Stated differently, the slot 50 may have a length corresponding to a desired range of motion of the bracket member 42 between the open and closed positions. Thus, the slot 50 may extend substantially parallel to the transverse axis "T" when the bracket member 42 is slidably mounted to the base plate 12. The third recess 48 may extend into the first end 44 of the bracket member 42 substantially parallel to the transverse axis "T." Alternatively, the third recess 48 may define an angle relative to the transverse axis "T" (not shown).

The third recess 48 may be at least partially defined by opposing legs 52 spaced apart from one another, e.g., top leg 52a and bottom leg 52b extending substantially parallel to the transverse axis "T." In an alternative embodiment, the top leg 52a may be eliminated.

As best seen in FIG. 3, the bracket member 42 may be slidably mounted to the base plate 12 using one or more posts 54 received in the slot 50, and a standoff or cap 56. For example, a pair of posts 54 may extend outwardly from the front face 24 into or through the slot 50, and the cap 56 may be secured to the posts 54, thereby securing the bracket member 42 between the base plate 12 and the cap 56. Thus, the cap 56 may have a cross-section larger than a width of the slot 50, i.e., to prevent the bracket member 42 from being removed from the base plate 12.

In an exemplary embodiment, the posts 54 may be button head screws, rivets, bolts, and the like. The base plate 12 may include a pair of corresponding openings 13, and the posts 54 may be received through the openings 13 from the back face of the base plate 12 such that ends of the posts 54 extend from the front face 24. Heads (not shown) of the posts 54 may abut the back face of the base plate 12, preventing the posts 54 from passing completely through the openings 13. Alternatively, the openings 13 may be eliminated, and the posts 54 may be attached directly to the front face 24 of the base plate 12 (not shown), e.g., by welding, bonding, fasteners, and the like.

The bracket member 42 may be placed against the front face 24 with the posts 54 extending into and/or through the slot 50. The cap 56 may be secured to the ends of the posts 54, e.g., by threading the ends of the posts 54 into corresponding threaded pockets 57 (one shown in FIG. 3) in the cap 56. Alternatively, the ends of the posts 54 may be securely received in corresponding pockets in the cap 56 using one or more of an interference fit, and/or using an adhesive, welding, and the like.

When the cap 56 is secured to the ends of the posts 54, the cap 56 is spaced sufficiently from the front face 24 to allow the bracket member 42 to slide along the front face 24. Optionally, as shown in FIG. 3, to facilitate movement of the bracket member 42, a spacer 90 may provided between the bracket member 42 and the base plate 12. The spacer 90 may include one or more openings 92 for receiving the posts 54 therethrough such that the spacer 90 may be placed against the front face 24 before the bracket member 42. The spacer 90 may thus be sandwiched between the bracket member 42 and the base plate 12. Alternatively, if desired, the spacer 90 may be secured to the front face 24 of the base plate 12, e.g., using an adhesive. The spacer 90 may be a relatively thin sheet or other film of a smooth, wear-resistant material, e.g., having a low coefficient of friction, such as PTFE (e.g., Teflon®).

Returning to FIGS. 1 and 2, the locking mechanism 60 generally includes a locking arm 62 carried by the bracket member 42, including a first end 64 pivotally mounted to the bracket member 42 and a second end 66 including a pawl or other catch 68. As shown in FIG. 3, the first end 64 of the locking arm 62 may be secured to the bracket member 42 by a fastener 70, e.g., a flat socket head screw. The fastener 70 may be inserted through a hole in the first end 64 of the locking arm 62 and into a threaded hole 71 in the bracket member 42 (shown in FIG. 3). Alternatively, other fasteners may be used to secure the locking arm 62, e.g., a rivet, bolt, post and cap (similar to the posts 54 and cap 56 described above).

The locking arm 62 may be located on the bracket member 42 such that the catch 68 contacts a side surface 56a of the cap 56 in the open position. Thus, when the bracket member 42 is directed from the open position (shown in FIG. 1) towards the closed position, the catch 68 may simply slide along the side surface 56a of the cap 56. Once the bracket member 42 reaches the closed position, as shown in FIG. 2, the catch 68 may move into contact with an end surface 56b of the cap 56, thereby achieving a locked or engaged position. As shown, the catch 68 includes a substantially blunt inner surface 68a that abuts the end surface 56b of the cap 56, thereby preventing movement of the bracket member 42 back towards the open position from the locked position. As described further below, the locking arm 62 may be selectively pivoted away from the cap 56 to a disengaged position, thereby disengaging the catch 68 from the cap 56, and allowing the bracket member 42 to be directed back towards the open position.

In an exemplary embodiment, the locking arm 62 may be biased towards the locked position, e.g., to preferentially maintain the catch 68 in engagement with the end surface 56b of the cap 56. For example, as shown in FIGS. 1-3, a spring 80 may be provided for biasing the locking arm 62 towards the cap 56. The bracket member 42 may include a flange 82 extending outwardly from the bracket member 42 such that the spring 80 may be disposed between the flange 82 and a side wall 62a of the locking arm 62.

The spring 80 may be a compression spring or other biasing mechanism coupled between the flange 82 and the side wall 62a by compression. In addition or alternatively, the spring may be secured to the flange 82 or other portion of the bracket member 42 and/or the locking arm 62. For example, one or both ends of the spring 80 may received in a pocket or hole (not shown) in the locking arm 62 and/or flange 80, e.g., by an interference fit, bonding, welding, and the like.

Consequently, the spring 80 may bias the locking arm 62 away from the flange 80, i.e., towards the side wall 56a of the cap 56. The bias may be overcome, however, by pivoting the locking arm 62 away from the cap 56, thereby further compressing the spring 80. When the locking arm 62 is released again, the spring 80 may resiliently direct the locking arm 62 back towards the cap 56.

Alternatively, other locking mechanisms may be provided on the bracket member 42 and/or base plate 12 for releasably locking the bracket member 42 in the closed and/or open positions. For example, a locking mechanism (not shown) similar to the locking arm 62 may be mounted to the base plate 12 that engages a portion of the bracket member 42 when the bracket member 42 is directed to the closed position. In a further alternative, the locking mechanism may be eliminated if it is desirable to allow the bracket member 42 to be moved freely between the open and closed positions. Returning to FIGS. 1 and 2, the upper portion 20 of the base plate 12 may include one or more connectors 22 for attaching the base plate to a post, plate, leg, or other support structure of an accessory (not shown). As shown, the connectors 22 include a pair of holes through the upper portion 20 of the base plate 12 that may receive fasteners, e.g., screws, bolts, rivets, and the like (not shown). The fasteners may be inserted through the holes 22, and into or through corresponding holes on the support structure (not shown), and secured thereto, e.g., using nuts, caps, welding, adhesives, and the like. Alternatively, other connectors may be provided on the upper portion 20 of the base plate 12. For example, a socket or other receiver (not shown) may be attached to the upper portion 20, e.g., using one or more fasteners, adhesives, welding, and the like, which may, in turn, receive a portion of a support structure therein.

To make the bracket apparatus 10, the components described above may be formed and/or assembled together. For example, the base plate 12 and/or bracket member 42 may be formed from a flat sheet of metal, e.g., hot rolled steel, galvanized steel, or stainless steel. The sheet may be cut into the desired shapes, for example, by laser cutting, die stamping, sheering, and the like. The flanges 80, 47 may be formed by cutting a flange when the sheet is cut into the shape of the bracket member 42, and then breaking or otherwise bending the flanges 80, 47 out of the plane of the sheet. As shown in FIG. 3, if desired, the base plate 12 may include a bend, e.g., such that the lower portion 14 is offset but substantially parallel to the upper portion 20. The openings 13, slot 50, and/or hole 71 may be created, for example, by laser-cutting, stamping, machining, or otherwise boring through the sheet before or after being cut into the base plate 12 and/or bracket member 42. Any rough edges of the base plate 12 and/or bracket member 42 may be ground or otherwise treated, and a desired finish may be applied, e.g., chrome, galvanizing, paint, and the like. In alternative embodiments, the bracket apparatus 10 may be formed from plastic or composite materials, e.g., by injection molding, hand lay-up, and the like.

Once the components are formed, the posts 54 may be inserted through the openings 13 from the back face of the base plate 12, and the spacer 90 may be placed against the front face 24 with the openings 92 over the posts 54. The bracket member 42 may be placed adjacent the front face 24 such that the posts 54 enter the slot 50. The cap 56 may then be placed over the posts 54 and secured thereto, e.g., by threaded, press-fitting, bonding, welding, or otherwise attaching the ends of the posts 54 to the cap 56.

The locking arm 62 may be placed over the bracket member 42 such that the first end 64 of the locking arm 62 overlies the hole 71. The fastener 70 may then be inserted into the first end 64 and threaded or otherwise secured into the hole 71. Optionally, Loctite or other material may be applied to the fastener 70 and/or the posts 54 before or after attachment. When the locking arm 62 is attached to the bracket member 42, the second end 66 of the locking arm 62 should be disposed adjacent the cap 56. The spring 80 may be placed between the cap 56 and the flange 80, e.g., before or after attaching the locking arm 62 to the bracket member 42. For example, one end of the spring 80 may be press-fit or otherwise inserted into a hole (not shown) in the side wall 56a of the cap 56, thereby preventing the spring 80 from accidentally being removed from the bracket apparatus 10.

Although the manufacturing and assembly process for the bracket apparatus 10 has been described as proceeding in a particular order, this order is merely exemplary. It will be appreciated that the components may be assembled or otherwise attached to one another in a different order, e.g., assembling the locking arm 62 to the bracket member 42 before attachment to the base plate 12.

Figure 4:
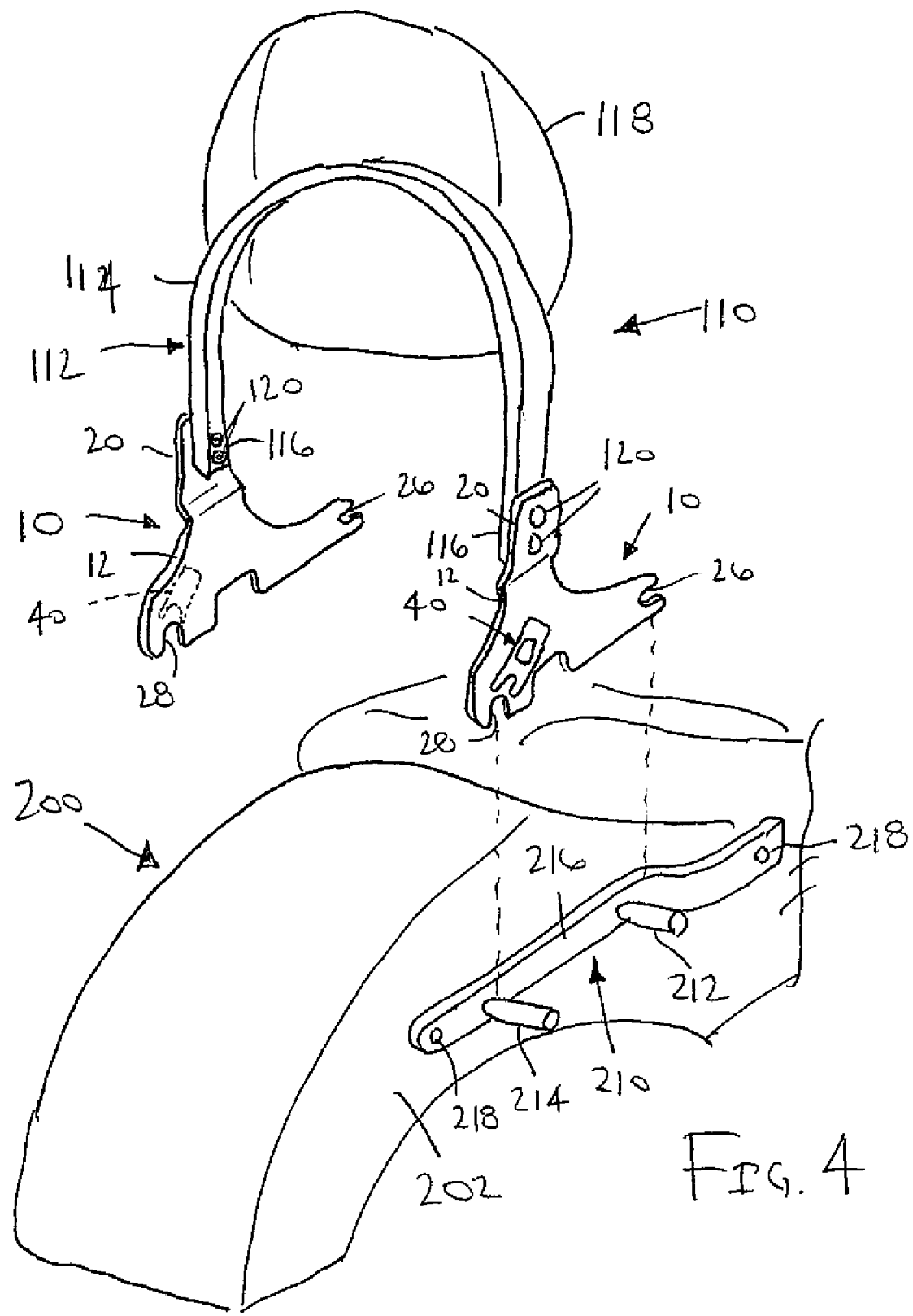
FIG. 4 is a perspective view of a backrest including a pair of bracket apparatus, such as the bracket apparatus shown in FIGS. 1-3, being secured to a motorcycle.

The assembled bracket apparatus 10 may then be incorporated into a final assembly, e.g., an accessory for a motorcycle or other vehicle. Turning to FIG. 4, an exemplary embodiment of a backrest accessory 110 is shown that includes a pair of bracket apparatus 10. Generally, the backrest accessory 110 includes a frame or other support structure 112. As shown, the frame 112 includes a substantially rigid bar 114 including first and second ends 116 attached to the respective bracket apparatus 10. Although a frame 112 is shown that includes only a single, curved bar 114, it will be appreciated that other frames 112 may be provided, e.g., including multiple posts, bars, rods, tubes, and the like. Exemplary frames and structure to which one or more bracket apparatus 10 may be attached are disclosed in U.S. Pat. Nos. 5,667,232, 5,725,138, and 6,347,804, the entire disclosures of which are expressly incorporated by reference herein.

Returning to FIG. 4, a backrest 120 is attached to the frame 114, e.g., using one or more fasteners (not shown), e.g., screws, buts and bolts, rivets, hook and loop fasteners, and/or using adhesives, welding, and the like. The backrest 118 may include a padded cushion, a shaped plastic or composite structure, and the like. Alternatively, instead of a backrest 118, a luggage or other rack may be attached to the frame 114, the configuration of which may be modified to accommodate the particular needs of the device being attached thereto.

The ends 116 of the post 114 may be aligned with the upper portions 20 of the base plate 12, and one or more fasteners 120 may be used to attach the bracket apparatus 10 to the frame 112. For example, as described above, the base plate 12 may include holes 22 (not shown in FIG. 4, see, e.g., FIGS. 1 and 2) through which the fasteners 120 may be inserted. The ends 116 of the post 114 may also include corresponding holes (not shown) through or into which the fasteners 120 may also be inserted. In exemplary embodiments, the fasteners 120 may include nuts and bolts, screws, rivets, pegs, and the like.

With continued reference to FIG. 4, the bracket apparatus 10 may facilitate attaching and/or detaching the backrest accessory 110 to a vehicle, such as motorcycle 200. As shown, the motorcycle 200 may include a mount 210 attached to the motorcycle, e.g., on each side of a fender 202 (only one mount 210 shown). Each mount 210 generally includes a pair of posts 212, 214, e.g., pegs, rods, tubes, or other structures extending from a base 216. The mounts 210 may be an original component of the motorcycle 200 or may be separate accessories that may be attached to the fender 202, frame, or other structure of the motorcycle 200. For example, the mounts 210 may be provided along with the backrest accessory 110 as a kit. The mounts 210 may be attached to the motorcycle 200, e.g., by inserting one or more fasteners 218, e.g., bolts, screws, rivets, and the like, through the base 216 of the mounts into the fender 202 or other structure of the motorcycle, and/or using bonding, welding, and the like.

To attach the backrest accessory 110 to the motorcycle 200, the latch member 40 may be directed to the open position shown in FIG. 1 (if not already in the open position). The backrest accessory 110 may be angled forward slightly, and the first recesses 26 may be aligned with the first posts 212. The backrest accessory 110 may be manipulated to insert the first posts 212 into the first recesses 26, and then insert the second posts 214 into the second recesses 28. To accomplish this second movement, the backrest accessory 110 may be simply be pivoted about the first posts 212, i.e., by lowering the backrest accessory 110 from the slightly forward orientation towards a horizontal orientation.

The latch members 40 on the bracket apparatus 10 may then be directed from the open position towards the closed position. The user may push on the flange 47 to facilitate such movement. With additional reference to FIGS. 1-3, each bracket member 42 may be slid along the posts 54 (shown in phantom in FIG. 3), i.e., along the transverse axis "T," such that the legs 52 defining the third recess 48 at least partially enclose the second recess 28.

For example, as shown in FIG. 3, the lower leg 52b of the bracket member 42 may intersect the vertical axis "V" and thereby partially enclose the second recess 28. Consequently, the second post 214 may be captured within the second and third recesses 28, 48, i.e., between the base plate 12 and the legs 52 of the bracket member 42. Thus, the bracket apparatus 10 may not be moved out of engagement with the posts 212, 214, thereby substantially securing the backrest accessory 110 relative to the motorcycle 200. In an exemplary embodiment, the resulting opening defined by the intersecting second and third recesses 28, 48 may correspond substantially in size and/or shape to the cross-section of the second post 214. Thus, the size and/or shape of the second and third recesses 28, 48 may be selected to prevent rattle or other substantial movement of the bracket apparatus 10 once it is secured to the mount 210.

With continued additional reference to FIGS. 1-3, each bracket member 42 may be locked in the closed position to prevent inadvertent separation of the bracket apparatus 10 from the mount 110, i.e., to prevent removal of the backrest accessory 110 from the motorcycle 200. As shown in FIG. 1, in the open position, the locking arm 60 may be free to slide along the cap 56, allowing the bracket member 42 to be moved from the open position towards the second recess 28. Once the bracket member 42 is directed to the closed position, shown in FIG. 2, the catch 68 may slide along and around the side wall 56a of the cap 56 into engagement with the end wall 56b of the cap 56, as shown in FIG. 3. In particular, because of the bias provided by the spring 80, as the bracket member 42 is directed towards the closed position, the locking arm 60 may automatically be pushed away from the flange 82, causing the catch 68 to engage the end wall 56b. Thereafter, if the bracket member 42 is moved back towards the open position, the blunt inner surface 68a of the catch 68 may abut the end wall 56b of the cap 56, thereby preventing further movement.

If and when it is desired to remove the backrest accessory 110 from the motorcycle 200, the locking arm 60 may be pivoted upwardly by the user (towards the flange 82 or away from the cap 56) until the catch 68 clears the cap 56. The bracket member 42 may then be directed back towards the open position. When the locking arm 60 is released, the spring 80 may cause the locking arm 60 to resiliently move away from the flange 82 and towards the cap 56. The catch 68, however, then merely contacts the side wall 56a of the cap 56, allowing the catch 68 to slide along the side wall 56a as the bracket member 42 is directed to the open position.

The backrest accessory 110 may then be lifted to remove the second posts 214 from the second recesses 28 of the bracket apparatus 10, allowing the first posts 212 to also be removed from the first recesses 26 of the bracket apparatus 10.

Alternatively, if desired, the length of the cap 56 parallel to the transverse axis "T" may be set such that the catch 68 falls at least partially behind the cap 56 in the open position (not shown). This configuration may prevent inadvertent advancement of the bracket member 42 from the open position towards the closed position. In this alternative, the catch 68 may include a tapered outer surface, which may slide along the cap 56 if sufficient force is applied, thereby directing the locking arm 60 along the side wall of the cap 56. Alternatively, the catch 68 may have a blunt outer surface (not shown), requiring the locking arm 60 to be moved upwardly before the bracket member 42 is moved from the open position. In further alternatives, other locking mechanisms (not shown) may be provided for securing the bracket member 42 in the open position until the locking mechanism is released.

While the invention is susceptible to various modifications and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

We claim:

1. A device for securing an accessory to a support structure on a vehicle, comprising:
   a base member comprising an upper portion for connecting to a vehicle accessory, and a lower portion including a first recess extending along a first axis for receiving a pin of the support structure therein when the base member is aligned with the support structure;
   a bracket member slidably mounted to the base member, the bracket member being slidable linearly along a transverse axis between an open position and a closed position, wherein, in the closed position, a portion of the bracket member at least partially encloses the first recess for securing the pin in the first recess; and
   a lock on at least one of the base member and the bracket member for releasably securing the bracket member in the closed position,
   wherein the lock comprises a locking arm pivotally mounted to the bracket member, the base member comprising a stop that the locking arm engages in the closed position to prevent subsequent movement of the bracket member towards the open position.

2. The device of claim 1, wherein the lower portion of the base member comprises first and second ends, and wherein the first end comprises the first recess, the device further comprising a second recess in the second end, the second recess extending along a second axis orthogonal to the first axis for receiving another pin of the support structure therein.

3. The device of claim 2, wherein the first axis extends substantially vertically and the second axis extends substantially horizontally.

4. The device of claim 3, wherein the transverse axis extends diagonally relative to the first axis.

5. The device of claim 1, wherein the first axis extends substantially vertically and the transverse axis extends diagonally relative to the first axis.

6. The device of claim 1, wherein the locking arm is biased into engaging the stop, the locking arm being pivotable for disengaging the locking arm from the stop, thereby allowing the bracket member to be directed towards the open position.

7. The device of claim 1, further comprising a support structure attached to the upper portion of the base member.

8. The device of claim 7, wherein the support structure comprises at least one of a backrest and a rack.

9. A backrest for a motorcycle, comprising:
   a base member comprising an upper portion, and a lower portion including first and second opposing ends, the first end comprising a first substantially vertical recess therein, the second end comprising a second substantially horizontal recess therein;
   a bracket member slidably mounted to the base member, the bracket member being slidable linearly along a transverse axis between an open position and a closed position, wherein, in the closed position, a third recess in the bracket member at least partially encloses the second recess for securing a pin within the second and third recesses;
   a lock on the bracket member for releasably securing the bracket member in the closed position; and
   a backrest member extending from the upper portion of the base member,
   wherein the lock comprises a locking arm pivotally mounted to the bracket member, the base member comprising a stop that the locking arm engages in the closed position to prevent subsequent movement of the bracket member towards the open position.

10. The backrest of claim 9, wherein the backrest member comprises a first post attached to the upper portion of the base member.

11. The backrest of claim 10, wherein the backrest member comprises a second post, an additional base portion attached to the post, and an additional bracket member and lock on the additional base portion.

12. The backrest of claim 9, wherein the transverse axis extends diagonally relative to the first axis.

13. The backrest of claim 9, wherein the locking arm is biased into engaging the stop, the locking arm being pivotable for disengaging the locking arm from the stop, thereby allowing the bracket member to be directed towards the open position.

14. The backrest of claim 9, wherein the third recess is at least partially defined by opposing legs that each extend substantially parallel to the transverse axis.

15. The backrest of claim 9, wherein the bracket member is slidably mounted to the base member by at least one post received in an elongate slot in the bracket member.

16. A device for securing an accessory to a support structure on a vehicle, comprising:
   a base member comprising an upper portion for connecting to a vehicle accessory, and a lower portion including a first recess extending along a first axis for receiving a pin of the support structure therein when the base member is aligned with the support structure;
   a post mounted on the base member;
   a bracket member slidable linearly on the post along a transverse axis that intersects the first axis, the bracket member slidable between an open position that allows a pin to be received in the first recess and a closed position that encloses the first recess for securing the pin in the first recess; and
   a locking arm rotatably mounted on the bracket member for releasably engaging the post to secure the bracket member in the closed position.

17. The device of claim 16, wherein the lower portion of the base member comprises first and second ends, and wherein the first end comprises the first recess, the device further comprising a second recess in the second end, the second recess extending along a second axis orthogonal to the first axis for receiving another pin of the support structure therein, the transverse axis intersecting the second axis.

18. The device of claim 16, wherein the transverse axis defines an acute angle between about thirty and sixty degrees (30-60°) relative to the first axis.

* * * * *